(12) United States Patent
Sennett et al.

(10) Patent No.: US 8,611,518 B1
(45) Date of Patent: Dec. 17, 2013

(54) SYSTEM AND METHOD TO DISPLAY CALLING AREA

(75) Inventors: DeWayne Allan Sennett, Redmond, WA (US); Brian Kevin Daly, Seattle, WA (US)

(73) Assignee: AT&T Mobility II LLC, Atlanta, GA (US)

(*) Notice: Subject to any disclaimer, the term of this patent is extended or adjusted under 35 U.S.C. 154(b) by 1992 days.

(21) Appl. No.: 11/468,561

(22) Filed: Aug. 30, 2006

(51) Int. Cl.
*H04M 3/42* (2006.01)
*H04M 1/64* (2006.01)
*H04M 1/56* (2006.01)
*H04M 15/06* (2006.01)
*H04M 3/493* (2006.01)

(52) U.S. Cl.
USPC ............... 379/201.02; 379/88.06; 379/142.1; 379/201.01; 455/414.1; 455/414.2

(58) Field of Classification Search
USPC ........ 379/88.06, 88.19, 142.1, 142.15, 88.05, 379/201.01, 201.02, 201.07, 207.12; 370/142.1; 455/414.1, 414.2
See application file for complete search history.

(56) References Cited

U.S. PATENT DOCUMENTS

| 6,240,170 | B1 * | 5/2001 | Shaffer et al. ............ 379/142.15 |
| 6,985,572 | B2 | 1/2006 | Gosselin |
| 7,170,984 | B2 | 1/2007 | Gosselin |
| 7,170,985 | B2 | 1/2007 | Gosselin |
| 7,200,212 | B2 | 4/2007 | Gosselin |
| 2005/0084078 | A1 * | 4/2005 | Miller et al. ............... 379/88.06 |

* cited by examiner

*Primary Examiner* — Khai N Nguyen
(74) *Attorney, Agent, or Firm* — Parks IP Law LLC; Mickki D. Murray, Esq.

(57) ABSTRACT

A system and method for delivering calling area information to a called party device within a telecommunications system are provided. The calling area information is stored in a network and/or a device calling area database and is accessible by their respective call processors. Upon receipt of an incoming call, a called party device can obtain calling area information from either database and can present it to the called party on a device display in the subscriber's preferred language.

18 Claims, 5 Drawing Sheets

SYSTEM AND METHOD TO DISPLAY CALLING AREA

TECHNICAL FIELD

This invention relates generally to caller identification, and more specifically to the delivery of calling area information to a telephone based on calling area information stored in a network database and/or a device database.

BACKGROUND OF THE INVENTION

Telephone numbering plans are systems that allow subscribers to make and receive telephone calls via telephone networks. The North American Numbering Plan (NANP) is a system that uses three-digit area codes and seven-digit telephone numbers to direct telephone calls to particular regions on a Public Switched Telephone Network (PSTN). Other countries throughout the world have established their own telephone numbering plans that implement a variety of systems and methods to facilitate telephone calls within and outside of their respective telephone networks. Many countries have numbering plans that include a country code, area code, telephone number, and in some instances, an international prefix. The NANP is used in the United States and its territories, Canada, Bermuda, and many Caribbean nations.

Although the NANP established a ten-digit numbering plan, dialing plans are not consistent throughout many regions. This is due to multiple area codes serving the same area (called overlays) and toll alerting (a leading 1 required for toll calls). In areas without overlays and without toll alerting, calls within an area code are dialed as a seven-digit telephone number and calls outside the area code are dialed as 1 followed by a three-digit area code and seven-digit telephone number. Many areas allow dialing 1 followed by a ten-digit number even for calls that could be dialed as seven-digits. In areas with overlays, local calls are all dialed as ten-digit numbers. This is common in cities with dense populations. For example, Atlanta, Ga., currently has four area codes. In areas without toll alerting, all calls to numbers within the caller's area code and any overlays serving the same area can be dialed as either a ten-digit number or 1 followed by the ten-digit number. Calls to areas outside an area code must be dialed as 1 followed by the ten-digit number. In areas with toll alerting, all toll calls must be dialed as 1 followed by a ten-digit number. Many areas allow local calls to be dialed as 1 followed by a ten-digit number or just the ten-digit number.

In many countries, wireline and wireless number have different area codes. The NANP uses the same area codes for both wireline and wireless customers. This has increased the number of area codes needed per physical area, resulting in multiple area code overlays, as is evidenced by the four area code overlays in the Atlanta area. Eventually, new telephone numbering plans with additional digits will need to be implemented to facilitate the need for telephone communications.

Caller Identification service (Caller ID) for conventional PSTNs is a widely used and popular feature. Caller ID delivers information to a call recipient regarding the identity of the party attempting to place a call. As is known in the art, caller ID information is typically delivered to the call recipient between the first and second telephone rings of an incoming call. On Wireless networks, caller ID information is instead sent on the signaling channel during alerting. The caller ID information can include the telephone number from which the calling party is placing the call or can include both the telephone number and the name of the entity associated with that number in telephone company records. Typically, the feature is provided to subscribers at an additional cost.

If the recipient of the call has caller ID compatible devices, the caller ID information is displayed to the recipient while the phone is ringing. This allows the recipient to decide whether or not to answer the call based on the caller ID information and can prevent the recipient from being surprised by the identity of the caller upon answering the phone.

Many individuals are now electing to have their information removed from caller ID databases. This prevents caller ID subscribers from receiving caller ID from an individual that does not want their information to be displayed. This can be frustrating for a subscriber regardless of the reason for the removal. Therefore, a heretofore unaddressed need exists to provide a system and method to retrieve and display caller information without compromising an individual's privacy.

SUMMARY

The present invention provides a system for providing calling area information to a communication device. The system can comprise a processor and computer readable memory, where the computer readable memory includes one or more logical mappings of strings of digits to calling area indications. The calling area indications can represent corresponding geographic areas. The memory can also include instructions to the processor to cause it to receive a telephone number corresponding to a telephone call intended for a communication device. The processor can then compare an initial segment of the received telephone number to the string of digits of one or more of the logical mappings. If a match is found, the processor can cause the corresponding calling area indication to be sent to the communication device.

The logical mapping can comprise a lookup table and/or a database. The strings of digits can comprise an area code, area code and an exchange, and/or a country code. The logical mappings can, for example, include mappings for each NANP area code.

The invention also provides a system for providing logical mapping updates for a communication device configured to display calling area information. The system can include a processor and computer readable memory. The computer readable memory can include one or more logical mappings of a string of digits to a calling area indication, where the calling area indication represents a corresponding geographic area. The computer readable memory can include instructions for causing the processor to receive a logical mapping update request from a communication device and send one or more updated logical mappings to the communication device.

Also disclosed herein is a communication device for displaying calling area information related to incoming telephone call. The device can comprise a processor, a display, and computer readable memory. The computer readable memory can include one or more logical mapping of a string of digits to a calling area indication which represents a corresponding geographic area. The computer readable memory can include instructions to cause the processor to receive a telephone number corresponding to an incoming telephone call, compare an initial segment of the received telephone number to the string of digits of the one or more logical mappings, and show the calling area indication for a matching string on the display of the device. The matching string for the calling area can be provided in the preferred language of the subscriber.

In some embodiments, the communication device can be configured to request updated logical mappings from a communication network if no match is found, receive an update, and store the update in the computer readable memory.

DETAILED DESCRIPTION

As required, detailed embodiments of the present invention are disclosed herein. It must be understood that the disclosed embodiments are merely exemplary of the invention that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

Figure 1:
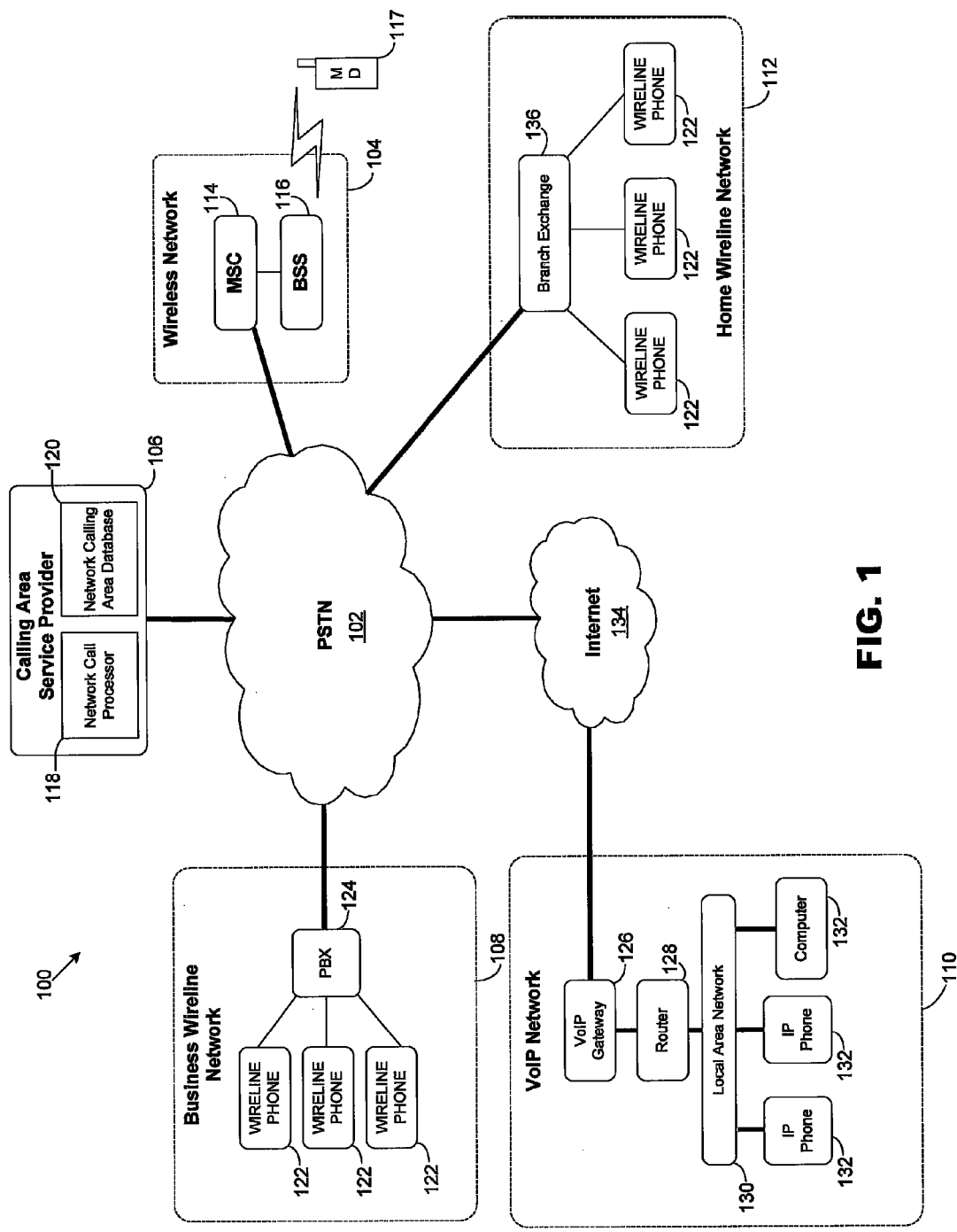
FIG. 1 is a block diagram illustrating an embodiment of a telecommunications system for displaying area information on a called device, according to the present invention.

Referring now to the drawings in which like numerals represent like elements throughout the several views, FIG. 1 depicts a telecommunications system 100, according to the present invention. The telecommunications system 100 can include both wireline and wireless communication networks interconnected through a public switched telephone network (PSTN) 102. In the illustrated embodiment, the telecommunications system 100 includes a wireless communication network 104, a calling area service provider 106, a business wireline network 108, a VoIP network 110, and a home wireline network 112.

The illustrated wireless communication network 104 includes a mobile switching center (MSC) 114 that is operatively linked to a base station system (BSS) 116. The BSS 116 can include one or more base stations controllers (BSC) and one or more base transceiver stations (BTS), which are connected to antennas for radiating transmitted signals and for receiving incoming signals. A mobile device 117 such as, but not limited to, a cellular telephone, is communicatively linked to the BSS 116 of wireless communication network 104. It is contemplated that the wireless communication network 104 can use cellular protocols such as, but not limited to, Time Division Multiple Access (TDMA), Code Division Multiple Access (CDMA), Universal Mobile Telecommunication System (UMTS), Global System for Mobile communication (GSM), High Speed Packet Access (HSPA), IEEE 802.x (WiFi), WiMAX, WiBRO, or any combination thereof.

The illustrated calling area service provider 106 includes a network call processor 118 operatively linked to a network calling area database 120. The network call processor 118 is responsible for receiving a query, which includes a calling party number; forwarding the query to the network calling area database 120; receiving a query response from the network calling area database 120; and delivering the calling party area information and calling party number to the called party's device. If no calling party area information is found, the calling party number can be delivered (subject to regulatory and privacy constraints). The network call processor 118 can be a computer, which may include one or more processors, a computer readable memory and/or storage unit, one or more input devices (such as a keyboard and/or pointing device), and one or more output devices (such as a display and/or printer). The method used by the network call processor 118 to process a call can be any of those known to those skilled in the art.

The network calling area database 120 is responsible for receiving a query from the network call processor 118; determining the calling party area based upon the area code, exchange code, and/or country code in the calling party number; and sending a query response with the associated calling party area to the network call processor 118. The network calling area database 120 can be a hierarchical, relational, or operational database. Alternatively, the network calling area database 120 can comprise a lookup table. The network calling area database 120 can be configured to store country codes, area codes, and/or exchange codes, and a character string to describe the corresponding country, area, and/or exchange location. The network calling area database 120 can also use any database software. In addition, the network calling area database 120 can be stored on a variety of storage devices that use interfaces such as Integrated Development Environment (IDE), Small Computer System Interface (SCSI), Universal Serial Bus (USB), and FireWire (IEEE-1394). Furthermore, storage schemes such as, but not limited to, Redundant Array of Independent (or Inexpensive) Disks (RAID) configurations may be implemented.

The illustrated business wireline network 108 includes a number of conventional wireline phones 122 communicatively linked to a private branch exchange (PBX) 124. A PBX, such as PBX 124, is used to setup, route, and terminate calls within a private telephone network, for example, a business telephone network. The PBX 124 can be communicatively linked to the PSTN 102.

The illustrated VoIP network 110 includes a VoIP gateway 126, which can include one or more standard phone connections (i.e., RJ-11) and one or more Ethernet connections (i.e., RJ-45) to communicate between the Internet 134 and a router 128. IP devices 132 are interconnected via a local area network (LAN) 130 and communicatively linked to the router 128, which in turn can be communicatively linked to a modem, such as a Digital Subscriber Line (DSL) or cable modem. It is also contemplated that the router 128 can be communicatively linked to a T1 line, T3 line, ISDN line, or similar line known to those skilled in the art. The router 128 can be a wireline or wireless router and may use IEEE 802.11 protocols (i.e., IEEE 802.11a, h, g, or n). It should be understood that the Internet 134 can comprise a packet switched telephone network. The illustrated IP devices 132 are IP phones and computers; however, any device capable of communicating with another device via Internet protocol may be used. It is contemplated that the business wireline network 108 and the VoIP network 110 can be combined to form a hybrid wireline and VoIP network. A hybrid wireline and VoIP network is typical of a business environment and incorporates elements and features of both a conventional wireline telephone network and a VoIP network.

The home wireline network 112 can include wireline phones 122 in communication with a branch exchange 136, which in turn can be in communication with the PSTN 102.

Figure 2:
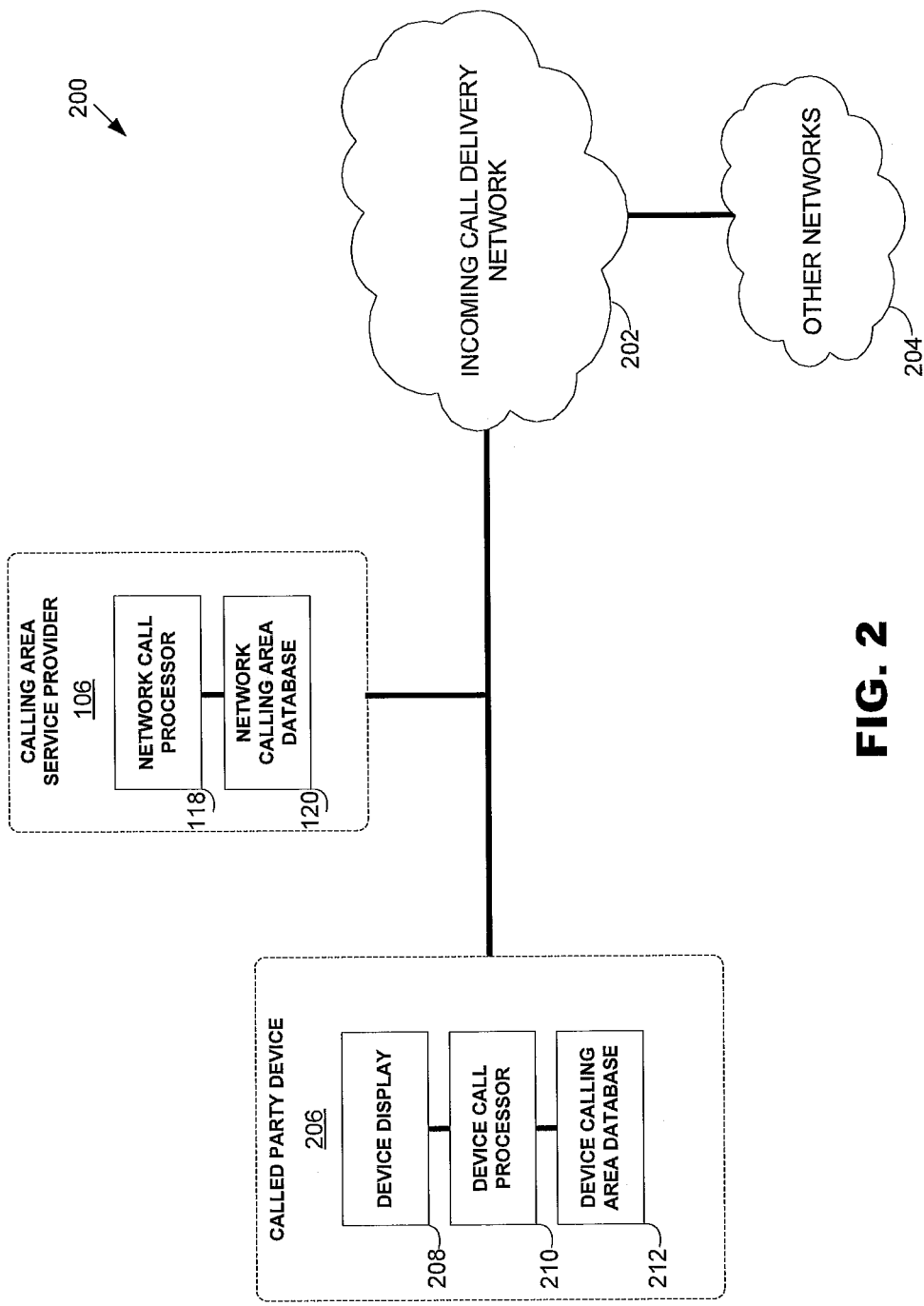
FIG. 2 is a block diagram illustrating various embodiments employing varying calling area database configuration, according to the present invention.

Referring now to FIG. 2, a telecommunications system 200 is shown. The telecommunications system 200 includes an incoming call delivery network 202 that is communicatively linked to other networks 204 and to a calling area service provider 106. The calling area service provider 106, which includes a network call processor 118 and a network calling area database 120, can be communicatively linked to a called party device 206 such as, but not limited to, a conventional wireline or mobile phone.

The incoming call delivery network 202 can be, for example, the PSTN 102 (as shown in FIG. 1). The other networks 204 can be any wireline or wireless networks known to those skilled in the art and can be located within or outside of the incoming call delivery network 202.

The illustrated called party device 206 includes a device display 208 operatively linked to a device call processor 210. The called party device 206 can be communicatively linked to the calling area service provider via, for example, signaling system no. 7 (SS7) trunks. The device display 208 can be, for example, a light emitting diode (LED) display, a thin-film transistor (TFT) display, a liquid crystal display (LCD), or any other display known to those skilled in the art. The device call processor 210 can be, for example, integral to the communication hardware of the called party device 206. Moreover, the device call processor 210 can be firmware on the called party device 206, software installed on a computer readable memory of the called party device 206, or any combination of hardware, software, and/or firmware capable of processing a call for the called party device 206.

In an alternative embodiment of the telecommunications system 200 an incoming call delivery network 202 is communicatively linked to other networks 204. The incoming call delivery network can be communicatively linked to a called party device 206 such as, but not limited to, a conventional wireline or mobile phone.

The incoming call delivery network 202 can be, for example, the PSTN 102 (as shown in FIG. 1). The other networks 204 can be any wireline or wireless networks known to those skilled in the art and can be located within or outside of the incoming call delivery network 202.

The illustrated called party device 206 includes a device display 208 operatively linked to a device call processor 210, which in turn is operatively linked to a device calling area database 212. The called party device 206 can be communicatively link to the calling area service provider via, for example, signaling system no. 7 (SS7) trunks. The device display 208 can be, for example, a light emitting diode (LED) display, a thin-film transistor (TFT) display, a liquid crystal display (LCD), or any other display known to those skilled in the art. The device call processor 210 can be, for example, integral to the communication hardware of the called party device 206. Moreover, the device call processor 210 can be firmware on the called party device 206, software installed on a computer readable memory of the called party device 206, or any combination of hardware, software, and/or firmware capable of processing a call for the called party device 206. The device calling area database 212 can be a hierarchical, relational, or operational database and can use any database software. Alternatively, the device calling area database 212 can comprise a lookup table. The device calling area database 212 can be configured to store country codes, area codes, and/or exchange codes, and a character string to describe the corresponding countries, areas, and/or exchanges. The device calling area database 212 can be stored in a computer readable memory of the called party device 206, wherein the computer readable memory is a permanent component of the called party device 206 and/or the computer readable memory is removable. A removable computer readable memory can include, but is not limited to, compact flash (CF), secure digital (SD), memory stick (MS), multimedia card (MMC), xD-picture card, smart media (SM), read-only memory (ROM), random access memory (RAM), and/or a hybrid of ROM and RAM.

In another alternative embodiment of the telecommunications system 20 an incoming call delivery network 202 is communicatively linked to other networks 204 and to a calling area service provider 106. The calling area service provider 106, which includes a network call processor 118 and a network calling area database 120, can be communicatively linked to a called party device 206 such as, but not limited to, a conventional wireline or mobile phone.

The incoming call delivery network 202 can be, for example, the PSTN 102 (as shown in FIG. 1). The other networks 204 can be any wireline or wireless networks known to those skilled in the art and can be located within or outside of the incoming call delivery network 202.

The illustrated called party device 206 includes a device display 208 operatively linked to a device call processor 210, which in turn is operatively linked to a device calling area database 212. The called party device 206 can be communicatively link to the calling area service provider via, for example, signaling system no. 7 (SS7) trunks. The device display 208 can be, for example, a light emitting diode (LED) display, a thin-film transistor (TFT) display, a liquid crystal display (LCD), or any other display known to those skilled in the art. The device call processor 210 can be, for example, integral to the communication hardware of the called party device 206. Moreover, the device call processor 210 can be firmware on the called party device 206, software installed on a computer readable memory of the called party device 206, or any combination of hardware, software, and/or firmware capable of processing a call for the called party device 206. The device calling area database 212 can be a hierarchical, relational, or operational database and can use any database software. Alternatively, the device calling area database 212 can comprise a lookup table. The device calling area database 212 can be configured to store country codes, area codes, and/or exchange codes, and a character string to describe the corresponding countries, areas, and/or exchanges. The device calling area database 212 can be stored in a computer readable memory of the called party device 206, wherein the computer readable memory is a permanent component of the called party device 206 and/or the computer readable memory is removable. A removable computer readable memory can include, but is not limited to, compact flash (CF), secure digital (SD), memory stick (MS), multimedia card (MMC), xD-picture card, smart media (SM), read-only memory (ROM), random access memory (RAM), and/or a hybrid of ROM and RAM.

Figure 4:
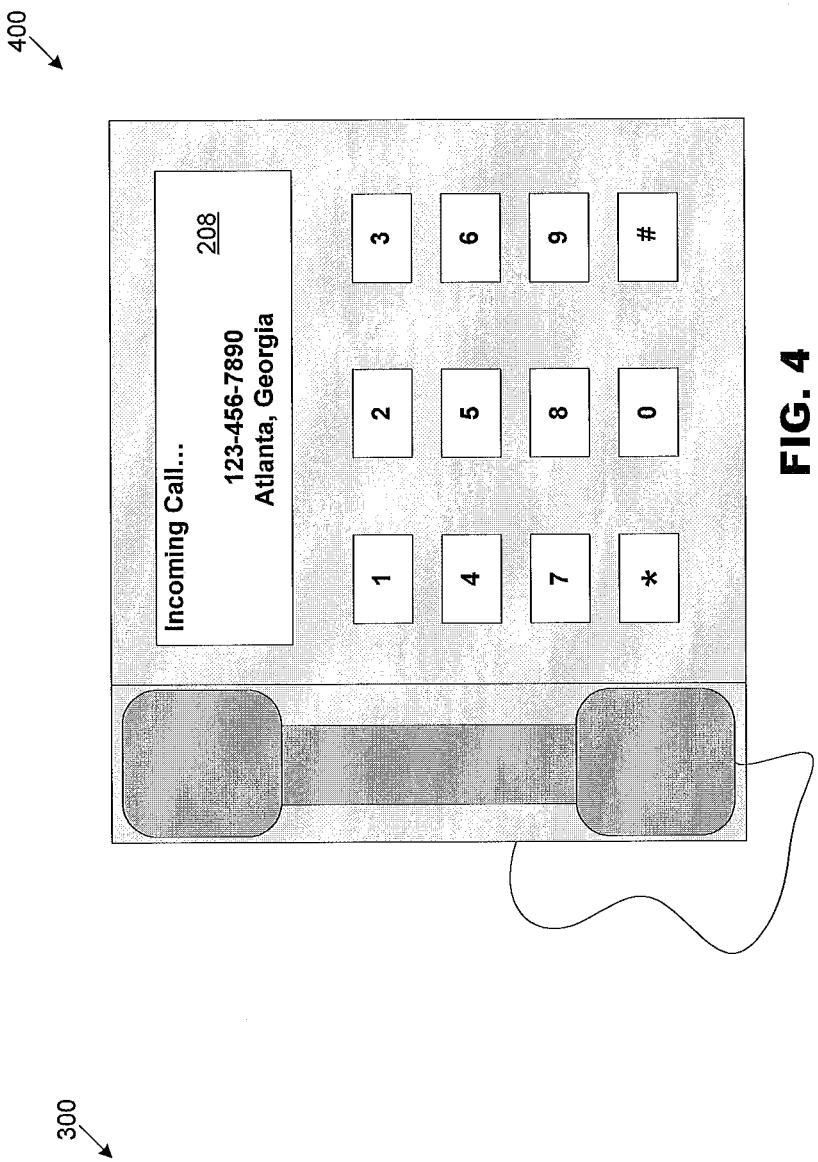
FIG. 4 illustrates a display on a landline device, according to the present invention.
Figure 3:
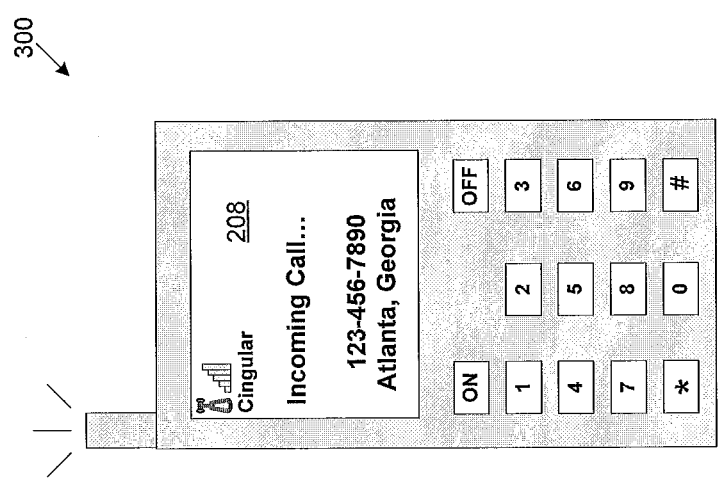
FIG. 3 illustrates a display on a mobile device, according to the present invention.

Referring now to FIG. 3 and FIG. 4, a mobile device 300 and a conventional wireline telephone 400 are both shown with a device display 208. The device display 208 shows an incoming call from telephone number 123-456-7890 and the calling area (i.e., Atlanta, Ga.) associated with the incoming call. It is contemplated that the calling party's number and calling area can be displayed in any font, style, color, and size and can be delivered in the preferred language of the subscriber.

Figure 5:
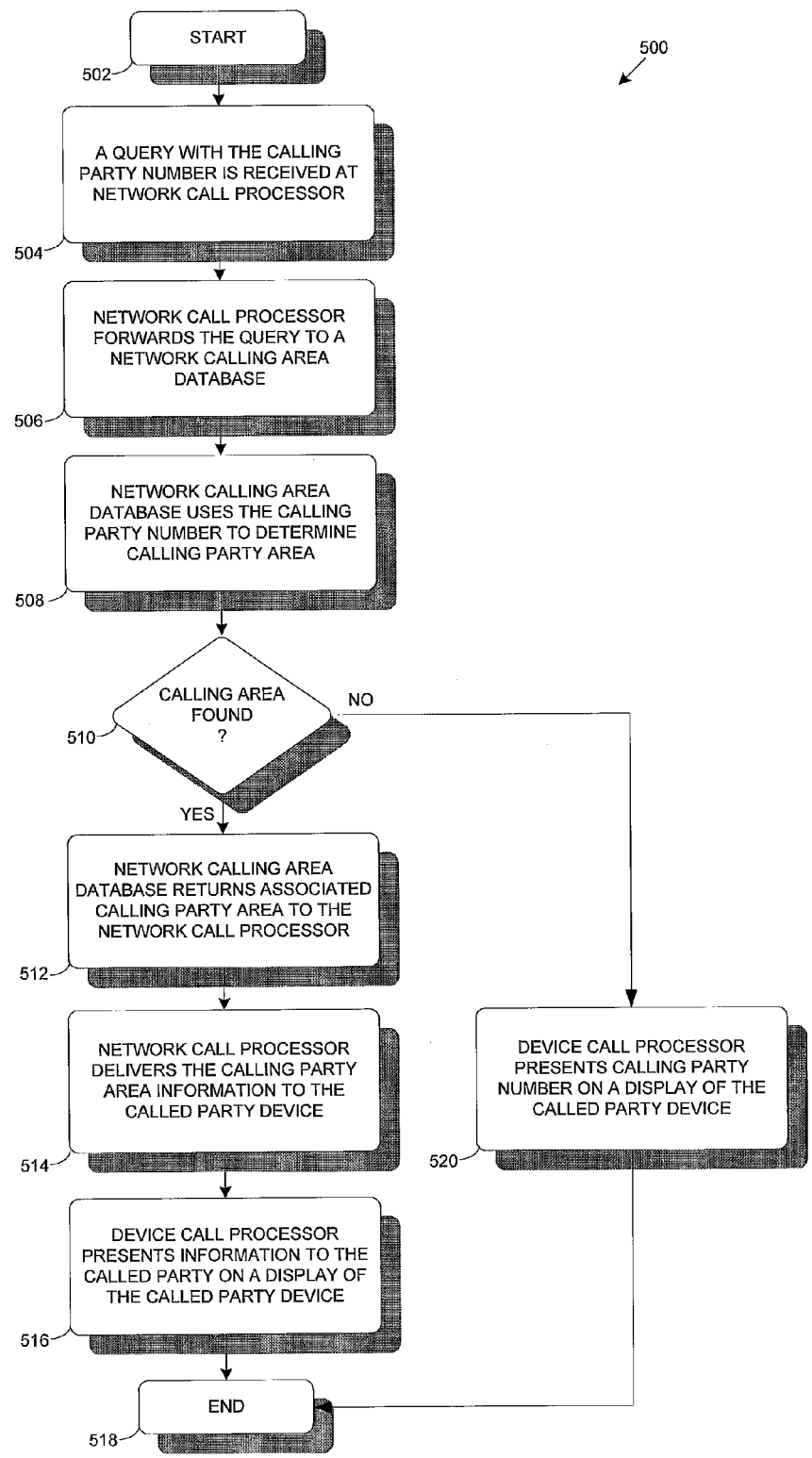
FIG. 5 illustrates a flow chart of an exemplary method for displaying calling area information retrieved from a network calling area database, according to the present invention.
Figure 6:
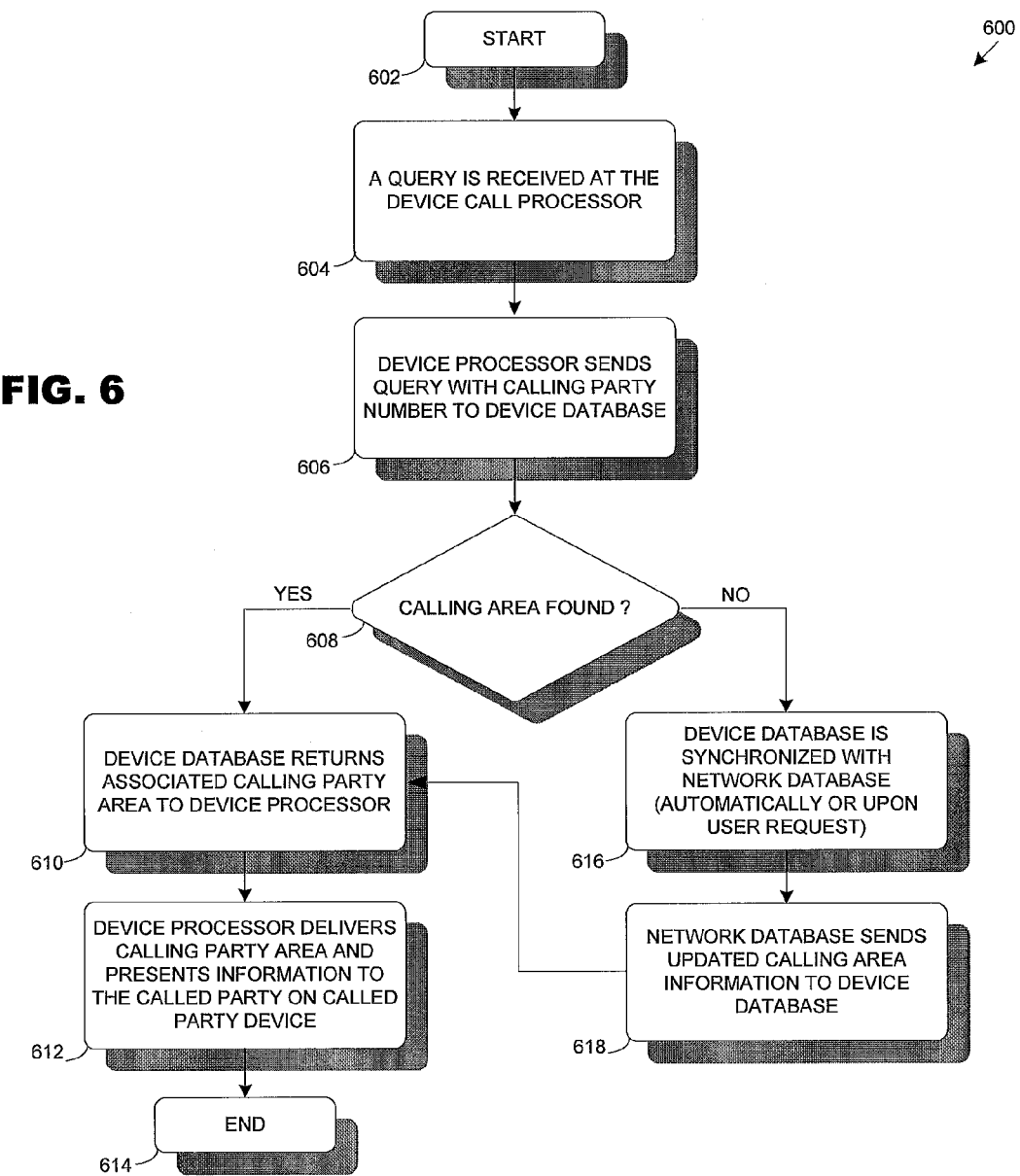
FIG. 6 illustrates allow chart of an exemplary method for displaying calling area information retrieved from a device calling area database, according to the present invention.

Referring now to FIG. 5 and FIG. 6, it should be understood that blocks are used in each of the illustrated methods described hereinafter to represent the steps of each exemplary method. Moreover, the arrangement of the illustrated blocks (steps) is not meant to limit the present invention and it is contemplated that the steps of the exemplary methods can be followed in any order capable of achieving a similar result. The exemplary methods described with respect to FIG. 5 and FIG. 6 assume a numbering plan substantially similar to the North American Numbering Plan (NANP); however, other numbering plans such as those with country codes are contemplated.

FIG. 5 shows a flow chart of an exemplary method 500 for delivering calling area information disposed within a network calling area database to a called party device 206. Before the method 500 begins, a call is received at the called party device 206 and a query is sent to the calling area service provider 118. This may occur between the first and second rings as is typical in a caller identification system for PSTN networks or during alerting signaling of a wireless device for wireless networks. The method 500 is now described with respect to FIGS. 1-4. The method 500 begins at block 502 and proceeds to block 504, where a query is received at the network call processor 118. The query can originate from a conventional wireline, VoIP, or wireless communication network, as illustrated in FIG. 1. Moreover, the query contains the calling party number which, in this example, includes a three-digit area code and seven-digit telephone number. The methods by which the query is routed within each of the conventional wireline, VoIP, and wireless communication networks can be any method known to those skilled in the art. After the query is received at block 504, the method 500 proceeds to block 506, where the network call processor 118 forwards the query to the network calling area database 120. At block 508, the network calling area database 120 receives the query (i.e., the calling party number) and uses the three-digit area code to perform a database search. At block 510, if a calling area is found, the method 500 proceeds to block 512, where the network calling area database 120 returns the calling party area information to the network call processor 118. The method 500 then proceeds to block 514, where the network call processor 118 forwards the calling party area information and calling party number to the called party device 206. At block 516, the device call processor 210 sends the calling party number and the calling area information to the device display 208 so that it may be presented to the called party (as shown in FIG. 3 and FIG. 4). The method 500 then proceeds to block 518 and the method 500 ends. At block 510, if the calling area is not found, the method 500 proceeds to block 520 and the device call processor 210 sends the calling party number to the device display 208 so that it may be presented to the called party (as shown in FIG. 3 and FIG. 4). The method 500 then proceeds to block 518 and the method 500 ends.

The network calling area database 120 can contain the matching area text strings in multiple languages (e.g., English, Spanish, French, and German). The indication of the subscriber's choice of preferred language could be provided in a network based subscriber profile server such as the HLR, HSS, or service profile servers. The network language of the text string delivered to the device can be based on the selection in the profile. Alternatively the matching string for a given call is sent in multiple languages by the network calling area database 120 to the mobile device 206. An application on the mobile device can use a preferred language indication that the subscriber pre-configured on the mobile device to determine which matching string should be displayed.

Referring now to FIG. 6, a flow chart of an exemplary method 600 for delivering calling area information disposed within a device calling area database to a display of the called party device 206 is shown. The method 600 is now described with reference to FIGS. 1-4. The method 600 begins at block 602 and proceeds to block 604, where a query is received at the device call processor 210. The query can originate from a conventional wireline, VoIP, or wireless communication network, as illustrated in FIG. 1. Moreover, the query contains the calling party number which, in this example, includes a three-digit area code and seven-digit telephone number. The methods by which a query is routed within each of the conventional wireline, VoIP, and wireless communication networks can be any method known to those skilled in the art. At block 606, the device call processor 210 forwards the query to the device calling area database 212. At block 608, if the calling area is found, the method 600 proceeds to block 610 where the device calling area database 212 returns the calling party area to the device call processor 210. At block 612, the device call processor 210 sends the calling party number and the calling area information to the device display 208 so that it may be presented to the called party (as shown in FIG. 3 and FIG. 4). The method 600 proceeds to block 614 and the method 600 ends. If the calling area is not found the calling number can be displayed on the device display. Alternatively, where a network calling area database is also available the method 600 proceeds to block 616, where the device calling area database 212 is synchronized with the network calling area database 120. It is contemplated that the synchronization between the device calling area database 212 and the network calling area database 118 can be automatic and/or completed upon user request. For example, the called party device 206 can periodically perform a database synchronization procedure to maintain current database entries or a user can request database synchronization whenever it may be convenient to do so. At block 618, the network calling area database 120 sends the updated calling area information to the device calling area database 212. The method 600 proceeds to block 610, where the device calling area database 212 returns the calling party area to the device call processor 210. At block 612, the device call processor 210 sends the calling party number and the calling area information to the device display 208 so that it may be presented to the called party (as shown in FIG. 3 and FIG. 4). The method 600 then proceeds to block 616 and the method 600 ends.

The calling area information can be provided in the subscriber's preferred language by storing a preferred language selection in a subscriber profile in the HLR, HSS, or any service profile server. This indication could be used to determine which set of matching strings of a several sets of strings in various languages should be downloaded over the air from the network calling area database 120 to the mobile device 206 (e.g., download an entire set, but only download matching strings in the subscriber's preferred language).

Alternatively all of the string sets (all available languages) to can be downloaded to the mobile device 206 from the network. The string to be displayed would be determined by the subscriber's pre-configured preferred language indicator on their mobile device (and the result of the query of the device calling area database 212). The advantage of this method is that if the subscriber changes their preferred language indication, the associated matching strings are already stored on the mobile device. This would allow for the sharing of the mobile device by one or more individuals who have different preferred language preferences.

The present invention as described herein provides a system and method for delivering calling area information to a called party device within a telecommunications system. The calling area information is stored in a network and/or a device calling area database and is accessible by their respective call processors. Upon receipt of an incoming call, a called party device can obtain calling area information from either database and can present it to the called party on a device display.

The law does not require and it is economically prohibitive to illustrate and teach every possible embodiment of the present invention. Hence, the above-described embodiments are merely exemplary illustrations of implementations set forth for a clear understanding of the principles of the invention. Variations, modifications, and combinations may be made to the above-described embodiments without departing from the scope of the invention. All such variations, modifications, and combinations are included herein by the scope of this disclosure.

What is claimed is:

1. A method, providing calling area information to a called party communications device via a network call processor, comprising:
    receiving, at the network call processor, a calling party number corresponding to a telephone call intended for the called party communications device that is associated with a called party;
    the network call processor querying a subscriber profile server for a preferred language of the called party;
    determining whether a calling area indication is available at a device calling area database in association with the calling party number, the calling area indication identifying a geographic area;
    in response to determining that the calling area indication is not available for the telephone call, initiating the device calling area database synchronizing with a network calling area database to include the calling area indication; and
    in response to (i) receiving the preferred language of the called party from the subscriber profile server and (ii) (a) determining that calling area indication is available or (b) the initiating, the network call processor sending the calling area indication, comprising the geographic area, in the preferred language to the called party communications device.

2. The method of claim 1, further comprising:
    selecting, at the network call processor, the calling area indication in an additional language; and
    the network call processor sending the calling area indication in the additional language to the called party communications device.

3. The method of claim 1, wherein:
    the determining includes comparing, at the network call processor, at least a portion of the calling party number to a digit string stored in the calling area database to identify the calling area indication associated with the calling party number, the digit string being logically mapped in the calling area database to the calling area indication; and
    the digit string is an area code.

4. The method of claim 1, wherein:
    the determining includes comparing, at the network call processor, at least a portion of the calling party number to a digit string stored in the calling area database to identify the calling area indication associated with the calling party number, the digit string being logically mapped in the calling area database to the calling area indication; and
    the digit string is an area code and an exchange.

5. The method of claim 1, wherein:
    the determining includes comparing, at the network call processor, at least a portion of the calling party number to a digit string stored in the calling area database to identify the calling area indication associated with the calling party number, the digit string being logically mapped in the calling area database to the calling area indication; and
    the digit string represents a country code.

6. The method of claim 1, wherein:
    the determining includes comparing, at the network call processor, at least a portion of the calling party number to a digit string stored in the calling area database to identify the calling area indication associated with the calling party number, the digit string being logically mapped in the calling area database to the calling area indication; and
    the digit string is a North American Numbering Plan area code.

7. The method of claim 1, wherein determining whether the calling area indication is available at the device calling area database for the telephone call is performed at the called party communication device.

8. The method of claim 1, wherein the network call processor sends the calling area indication, comprising the geographic area, in the preferred language to the called party communications device without caller-identifying information to protect privacy of the caller.

9. The method of claim 1, wherein the geographic area identifies a city.

10. A method, for providing calling area information to a called party communications device via a device call processor of the called party communications device, comprising:
    receiving, at the device call processor of the called party communications device, a calling party number corresponding to a telephone call from a calling party communications device;
    the device calf processor of the called party communications device querying an application stored in a memory of the called party communications device for a preferred language of the called party;
    determining whether a calling area indication is available at a calling area database associated with the called party communications device for the telephone call, the calling area indication identifying a geographic area;
    in response to determining that the calling area indication is not available for the telephone call, initiating the called party communications device calling area database to synchronize with a network calling area database to include the calling area indication;
    in response to (i) receiving the preferred language of the called party from the subscriber profile server and (ii) (a) determining that calling area indication is available or (b) the initiating, causing to be displayed on a display of the called party communications device, the calling area indication, in the preferred language.

11. The method of claim 10, wherein the causing includes causing to be displayed the calling area indication in the preferred language and an additional language.

12. The method of claim 10, wherein:
    the determining includes comparing, at the network call processor, at least a portion of the calling party number to a digit string stored in the calling area database to identify the calling area indication associated with the calling party number, the digit string being logically mapped in the calling area database to the calling area indication; and the digit string is an area code.

13. The method of claim 10:
the determining includes comparing, at the network call processor, at least a portion of the calling party number to a digit string stored in the calling area database to identify the calling area indication associated with the calling party number, the digit string being logically mapped in the calling area database to the calling area indication; and the digit string is an area code and an exchange.

14. The method of claim 10, wherein:
the determining includes comparing, at the network call processor, at least a portion of the calling party number to a digit string stored in the calling area database to identify the calling area indication associated with the calling party number, the digit string being logically mapped in the calling area database to the calling area indication; and the digit string represents a country code.

15. The method of claim 10, wherein:
the determining includes comparing, at the network call processor, at least a portion of the calling party number to a digit string stored in the calling area database to identify the calling area indication associated with the calling party number, the digit string being logically mapped in the calling area database to the calling area indication; and the digit string is a North American Numbering Plan area code.

16. The method of claim 10, wherein determining whether the calling area indication is available at the device calling area database for the telephone call is performed at the called party communication device.

17. The method of claim 10, wherein causing display of the calling area indication in the preferred language includes causing the indication to be displayed without caller-identifying information to protect privacy of the caller.

18. The method of claim 10, wherein the geographic area identifies a city.

* * * * *